United States Patent
Jung

(10) Patent No.: US 9,784,947 B2
(45) Date of Patent: Oct. 10, 2017

(54) LENS MODULE

(71) Applicant: Samsung Electro-Mechanics Co., Ltd., Suwon-si (KR)

(72) Inventor: Jin Hwa Jung, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 76 days.

(21) Appl. No.: 14/934,678

(22) Filed: Nov. 6, 2015

(65) Prior Publication Data
US 2016/0139369 A1    May 19, 2016

(30) Foreign Application Priority Data

Nov. 18, 2014  (KR) .................. 10-2014-0161133

(51) Int. Cl.
*G02B 13/00* (2006.01)
*G02B 9/60* (2006.01)

(52) U.S. Cl.
CPC ........... *G02B 13/0045* (2013.01); *G02B 9/60* (2013.01)

(58) Field of Classification Search
CPC .............................. G02B 9/60; G02B 13/0045
USPC .................................................. 359/714, 770
See application file for complete search history.

(56) References Cited

U.S. PATENT DOCUMENTS

| 8,908,289 B2* | 12/2014 | Noda ............... G02B 13/0045 359/714 |
| 9,046,639 B2* | 6/2015 | Shih ................. G02B 13/0045 |
| 9,529,179 B2* | 12/2016 | Huang ................ G02B 13/06 |
| 2011/0157724 A1 | 6/2011 | Baba |
| 2013/0308206 A1* | 11/2013 | Hsu .................. G02B 13/0045 359/714 |
| 2014/0211328 A1 | 7/2014 | Hashimoto et al. |

FOREIGN PATENT DOCUMENTS

| CN | 102109659 A | 6/2011 |
| KR | 10-2013-0055137 A | 5/2013 |

* cited by examiner

*Primary Examiner* — Zachary Wilkes
(74) *Attorney, Agent, or Firm* — NSIP Law

(57) ABSTRACT

A lens module includes a first lens having negative refractive power; a second lens having positive refractive power; a third lens having refractive power; a fourth lens having positive refractive power; and a fifth lens having negative refractive power. The first to fifth lenses are sequentially disposed in numerical order from an object side of the lens module toward an image plane of the lens module, and $0.3<(r1-r2)/(r1+r2)$ is satisfied, where r1 is a radius of curvature of an object-side surface of the first lens, and r2 is a radius of curvature of an image-side surface of the first lens.

15 Claims, 20 Drawing Sheets

| SURFACE NO. | RADIUS OF CURVATURE | THICKNESS /DISTANCE | REFRACTIVE INDEX | ABBE NUMBER | REMARKS |
|---|---|---|---|---|---|
| OBJECT | Infinity | Infinity | | | |
| 1 | 200.000 | 0.378 | 1.544 | 56.1 | FIRST LENS |
| 2 | 14.721 | 1.012 | | | |
| Stop | Infinity | 0.000 | | | |
| 3 | 2.184 | 0.507 | 1.544 | 56.1 | SECOND LENS |
| 4 | -1.208 | 0.100 | | | |
| 5 | 18.357 | 0.200 | 1.616 | 25.6 | THIRD LENS |
| 6 | 1.469 | 0.252 | | | |
| 7 | -2.155 | 0.463 | 1.544 | 56.1 | FOURTH LENS |
| 8 | -0.556 | 0.100 | | | |
| 9 | 1.531 | 0.250 | 1.544 | 56.1 | FIFTH LENS |
| 10 | 0.471 | 0.258 | | | |
| 11 | Infinity | 0.110 | | | FILTER |
| 12 | Infinity | 0.448 | | | |
| IMAGE PLANE | Infinity | 0.002 | | | |

FIG. 4

| FIRST EXAMPLE | 1 | 2 | 3 | 4 | 5 | 6 | 7 | 8 | 9 | 10 |
|---|---|---|---|---|---|---|---|---|---|---|
| RADIUS OF CURVATURE | 200 | 14.721 | 2.184 | −1.208 | 18.357 | 1.469 | −2.155 | −0.556 | 1.531 | 0.471 |
| CONIC (k) | 0 | 0 | −6.547 | −1.21 | 0 | −4.096 | 0 | −3.719 | 0 | −4.235 |
| 4TH ORDER (A) | 0.112 | 0.177 | −0.21 | −0.473 | −0.556 | −0.06 | 0.439 | −0.153 | −0.7 | −0.32 |
| 6TH ORDER (B) | −0.049 | −0.094 | −1.185 | 0.172 | 0.74 | 0.107 | −0.362 | 0.025 | 0.383 | 0.263 |
| 8TH ORDER (C) | 0.019 | 0.049 | 2.308 | −1.022 | 1.564 | 0.37 | −0.099 | 0.773 | −0.062 | −0.159 |
| 10TH ORDER (D) | −0.002 | 0 | −10.247 | 1.94 | −0.667 | 0.273 | 1.183 | −0.535 | −0.01 | 0.046 |
| 12TH ORDER (E) | 0 | 0 | −0.693 | −5.598 | −5.465 | −0.69 | −1.919 | 0.311 | −0.003 | −0.002 |
| 14TH ORDER (F) | 0 | 0 | −6.433 | −1.953 | 5.184 | 0 | 0.965 | −0.355 | 0.001 | −0.001 |

FIG. 5

| SURFACE NO. | RADIUS OF CURVATURE | THICKNESS /DISTANCE | REFRACTIVE INDEX | ABBE NUMBER | REMARKS |
|---|---|---|---|---|---|
| OBJECT | Infinity | Infinity | | | |
| 1 | 100.000 | 0.470 | 1.544 | 56.1 | FIRST LENS |
| 2 | 11.467 | 0.940 | | | |
| Stop | Infinity | 0.017 | | | |
| 3 | 2.575 | 0.426 | 1.544 | 56.1 | SECOND LENS |
| 4 | -0.980 | 0.100 | | | |
| 5 | -13.511 | 0.200 | 1.616 | 25.6 | THIRD LENS |
| 6 | 1.509 | 0.242 | | | |
| 7 | -1.975 | 0.473 | 1.544 | 56.1 | FOURTH LENS |
| 8 | -0.545 | 0.100 | | | |
| 9 | 1.581 | 0.270 | 1.544 | 56.1 | FIFTH LENS |
| 10 | 0.479 | 0.251 | | | |
| 11 | Infinity | 0.110 | | | FILTER |
| 12 | Infinity | 0.451 | | | |
| IMAGE PLANE | Infinity | -0.001 | | | |

FIG. 9

| SECOND EXAMPLE | 1 | 2 | 3 | 4 | 5 | 6 | 7 | 8 | 9 | 10 |
|---|---|---|---|---|---|---|---|---|---|---|
| RADIUS OF CURVATURE | 100 | 11.467 | 2.575 | -0.98 | -13.511 | 1.509 | -1.975 | -0.545 | 1.581 | 0.479 |
| CONIC (k) | 0 | 0 | -21.678 | -0.908 | 0 | -4.75 | 0 | -3.387 | 0 | -4.302 |
| 4TH ORDER (A) | 0.116 | 0.201 | -0.332 | -0.513 | -0.512 | -0.037 | 0.461 | -0.191 | -0.682 | -0.322 |
| 6TH ORDER (B) | -0.048 | -0.096 | -1.68 | -0.226 | 0.918 | 0.163 | -0.342 | 0.086 | 0.379 | 0.262 |
| 8TH ORDER (C) | 0.018 | 0.055 | 0.892 | -1.956 | 1.696 | 0.327 | -0.066 | 0.822 | -0.052 | -0.159 |
| 10TH ORDER (D) | -0.002 | 0 | -24.507 | 5.948 | -1.171 | 0.01 | 1.108 | -0.565 | -0.01 | 0.046 |
| 12TH ORDER (E) | 0 | 0 | -0.693 | -29.182 | -7.001 | -0.461 | -2.053 | 0.246 | -0.003 | -0.002 |
| 14TH ORDER (F) | 0 | 0 | -6.433 | -1.953 | 8.744 | 0 | 1.343 | -0.325 | 0.001 | -0.001 |

FIG. 10

| SURFACE NO. | RADIUS OF CURVATURE | THICKNESS /DISTANCE | REFRACTIVE INDEX | ABBE NUMBER | REMARKS |
|---|---|---|---|---|---|
| OBJECT | Infinity | Infinity | | | |
| 1 | 6.941 | 0.453 | 1.544 | 56.1 | FIRST LENS |
| 2 | 3.504 | 0.709 | | | |
| Stop | Infinity | 0.017 | | | |
| 3 | 3.308 | 0.444 | 1.544 | 56.1 | SECOND LENS |
| 4 | -1.054 | 0.100 | | | |
| 5 | 6.876 | 0.211 | 1.616 | 25.6 | THIRD LENS |
| 6 | 1.211 | 0.259 | | | |
| 7 | -2.879 | 0.613 | 1.544 | 56.1 | FOURTH LENS |
| 8 | -0.595 | 0.100 | | | |
| 9 | 1.493 | 0.322 | 1.616 | 25.6 | FIFTH LENS |
| 10 | 0.550 | 0.262 | | | |
| 11 | Infinity | 0.110 | | | FILTER |
| 12 | Infinity | 0.456 | | | |
| IMAGE PLANE | Infinity | -0.006 | | | |

FIG. 14

| THIRD EXAMPLE | 1 | 2 | 3 | 4 | 5 | 6 | 7 | 8 | 9 | 10 |
|---|---|---|---|---|---|---|---|---|---|---|
| RADIUS OF CURVATURE | 6.941 | 3.504 | 3.308 | -1.054 | 6.876 | 1.211 | -2.879 | -0.595 | 1.493 | 0.55 |
| CONIC (K) | 0 | 0 | -12.476 | -1.509 | 0 | -6.415 | 0 | -2.878 | 0 | -4.266 |
| 4TH ORDER (A) | 0.135 | 0.257 | -0.288 | -0.446 | -0.685 | -0.111 | 0.293 | -0.159 | -0.596 | -0.284 |
| 6TH ORDER (B) | -0.053 | -0.084 | -1.229 | -0.084 | 0.765 | 0.126 | -0.309 | -0.162 | 0.31 | 0.222 |
| 8TH ORDER (C) | 0.022 | 0.035 | 2.193 | -2.066 | 1.537 | 0.338 | 0.01 | 0.662 | -0.067 | -0.128 |
| 10TH ORDER (D) | -0.006 | 0 | -17.369 | 7.948 | -0.86 | -0.006 | 1.034 | -0.483 | 0.002 | 0.041 |
| 12TH ORDER (E) | 0 | 0 | -0.693 | -24.119 | -6.384 | -0.43 | -2.182 | 0.408 | 0.001 | -0.004 |
| 14TH ORDER (F) | 0 | 0 | -6.433 | -1.953 | 6.891 | 0 | 1.433 | -0.317 | -0.002 | 0 |

FIG. 15

| SURFACE NO. | RADIUS OF CURVATURE | THICKNESS /DISTANCE | REFRACTIVE INDEX | ABBE NUMBER | REMARKS |
|---|---|---|---|---|---|
| OBJECT | Infinity | Infinity | | | |
| 1 | 100.000 | 0.461 | 1.544 | 56.1 | FIRST LENS |
| 2 | 20.003 | 0.839 | | | |
| Stop | Infinity | 0.017 | | | |
| 3 | 2.664 | 0.429 | 1.544 | 56.1 | SECOND LENS |
| 4 | −1.102 | 0.100 | | | |
| 5 | −24.092 | 0.200 | 1.616 | 25.6 | THIRD LENS |
| 6 | 1.710 | 0.249 | | | |
| 7 | −1.995 | 0.485 | 1.544 | 56.1 | FOURTH LENS |
| 8 | −0.556 | 0.106 | | | |
| 9 | 1.639 | 0.270 | 1.544 | 56.1 | FIFTH LENS |
| 10 | 0.476 | 0.271 | | | |
| 11 | Infinity | 0.110 | | | FILTER |
| 12 | Infinity | 0.455 | | | |
| IMAGE PLANE | Infinity | −0.001 | | | |

FIG. 19

| FOURTH EXAMPLE | 1 | 2 | 3 | 4 | 5 | 6 | 7 | 8 | 9 | 10 |
|---|---|---|---|---|---|---|---|---|---|---|
| RADIUS OF CURVATURE | 100 | 20.003 | 2.664 | -1.102 | -24.092 | 1.71 | -1.995 | -0.556 | 1.639 | 0.476 |
| CONIC (k) | 0 | 0 | -20.349 | -0.446 | 0 | -3.355 | 0 | -3.44 | 0 | -4.172 |
| 4TH ORDER (A) | 0.1 | 0.183 | -0.295 | -0.592 | -0.572 | -0.054 | 0.412 | -0.195 | -0.69 | -0.314 |
| 6TH ORDER (B) | -0.041 | -0.106 | -1.402 | 0.532 | 1.11 | 0.12 | -0.37 | 0.064 | 0.398 | 0.259 |
| 8TH ORDER (C) | 0.018 | 0.072 | 0.639 | -4.173 | 1.5 | 0.491 | -0.019 | 0.641 | -0.058 | -0.147 |
| 10TH ORDER (D) | -0.002 | 0 | -16.658 | 12.888 | -1.356 | -0.148 | 1.094 | -0.499 | -0.011 | 0.042 |
| 12TH ORDER (E) | 0 | 0 | -0.693 | -32.334 | -7.505 | -0.501 | -2.096 | 0.467 | -0.002 | -0.003 |
| 14TH ORDER (F) | 0 | 0 | -6.433 | -1.953 | 9.511 | 0 | 1.384 | -0.442 | 0.001 | 0 |

FIG. 20

LENS MODULE

CROSS-REFERENCE TO RELATED APPLICATION

This application claims the benefit under 35 USC 119(a) of Korean Patent Application No. 10-2014-0161133 filed on Nov. 18, 2014, in the Korean Intellectual Property Office, the entire disclosure of which is incorporated herein by reference for all purposes.

BACKGROUND

1. Field

This application relates to a lens module having an optical system including five lenses.

2. Description of Related Art

A lens module mounted in a camera module provided in a mobile communications terminal includes a plurality of lenses. As an example, the lens module may include five lenses in order to configure a high-resolution optical system.

However, when a high-resolution optical system is configured using the plurality of lenses as described above, a length (the distance from an object-side surface of a first lens to an image plane of an image sensor) of the optical system may be increased. In this case, it is difficult to mount the lens module in a thin mobile communications terminal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a lens module includes a first lens having negative refractive power; a second lens having positive refractive power; a third lens having refractive power; a fourth lens having positive refractive power; and a fifth lens having negative refractive power and having one or more inflection points on an image-side surface thereof; wherein the first to fifth lenses are sequentially disposed in numerical order from the first lens to the fifth lens from an object side of the lens module toward an image plane of the lens module; and $0.3<(r1-r2)/(r1+r2)$ is satisfied, where r1 is a radius of curvature of an object-side surface of the first lens, and r2 is a radius of curvature of an image-side surface of the first lens.

The third lens may have negative refractive power.

In the lens module, $1.9<\text{ImgH}/\text{EPD}$ may be satisfied, where ImgH is ½ of a diagonal length of the image plane, and EPD is an entrance pupil diameter of the lens module.

In the lens module, $f1/f<-7.6$ may be satisfied, where f is an overall focal length of an optical system including the first to fifth lenses, and f1 is a focal length of the first lens.

In the lens module, $n3-n5<0.1$ may be satisfied, where n3 is a refractive index of the third lens, and n5 is a refractive index of the fifth lens.

In the lens module, $0.7<(r5-r6)/(r5+r6)$ may be satisfied, where r5 is a radius of curvature of an object-side surface of the third lens, and r6 is a radius of curvature of an image-side surface of the third lens.

In the lens module, $1.7<r1/TTL$ may be satisfied, where r1 is the radius of curvature of the object-side surface of the first lens, and TTL is a distance from the object-side surface of the first lens to the image plane.

In the lens module, $87.0<\text{FOV}$ may be satisfied, where FOV is a field of view of an optical system including the first to fifth lenses.

In another general aspect, a lens module includes a first lens having negative refractive power; a second lens, both surfaces thereof being convex; a third lens having refractive power; a fourth lens, an object-side surface thereof being concave and an image-side surface thereof being convex; and a fifth lens, an object-side surface thereof being convex and an image-side surface thereof being concave, the fifth lens having one or more inflection points on the image-side surface; wherein the first to fifth lenses are sequentially disposed in numerical order from the first lens to the fifth lens from an object side of the lens module toward an image plane of the lens module; and $0.3<(r1-r2)/(r1+r2)$ is satisfied, where r1 is a radius of curvature of an object-side surface of the first lens, and r2 is a radius of curvature of an image-side surface of the first lens.

The object-side surface of the first lens may be convex, and the image-side surface of the first lens may be concave.

An object-side surface of the third lens may be convex, and an image-side surface of the third lens may be concave.

An object-side surface of the third lens may be concave, and an image-side surface of the third lens may be convex.

The second lens may have positive refractive power.

The third lens may have negative refractive power.

The fourth lens may have positive refractive power.

The fifth lens may have negative refractive power.

Other features and aspects will be apparent from the following detailed description, the drawings, and the claims.

BRIEF DESCRIPTION OF THE DRAWINGS

FIG. 4 is a table listing characteristics of the lenses of the lens module illustrated in FIG. 1.

FIG. 5 is a table listing aspherical surface coefficients of the lenses of the lens module illustrated in FIG. 1.

FIG. 9 is a table listing characteristics of the lenses of the lens module illustrated in FIG. 6.

FIG. 10 is a table listing aspherical surface coefficients of the lenses of the lens module illustrated in FIG. 6.

FIG. 14 is a table listing characteristics of the lenses of the lens module illustrated in FIG. 11.

FIG. 15 is a table listing aspherical surface coefficients of the lenses of the lens module illustrated in FIG. 11.

FIG. 19 is a table listing characteristics of the lenses of the lens module illustrated in FIG. 16.

FIG. 20 is a table listing aspherical surface coefficients of the lenses of the lens module illustrated in FIG. 16.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
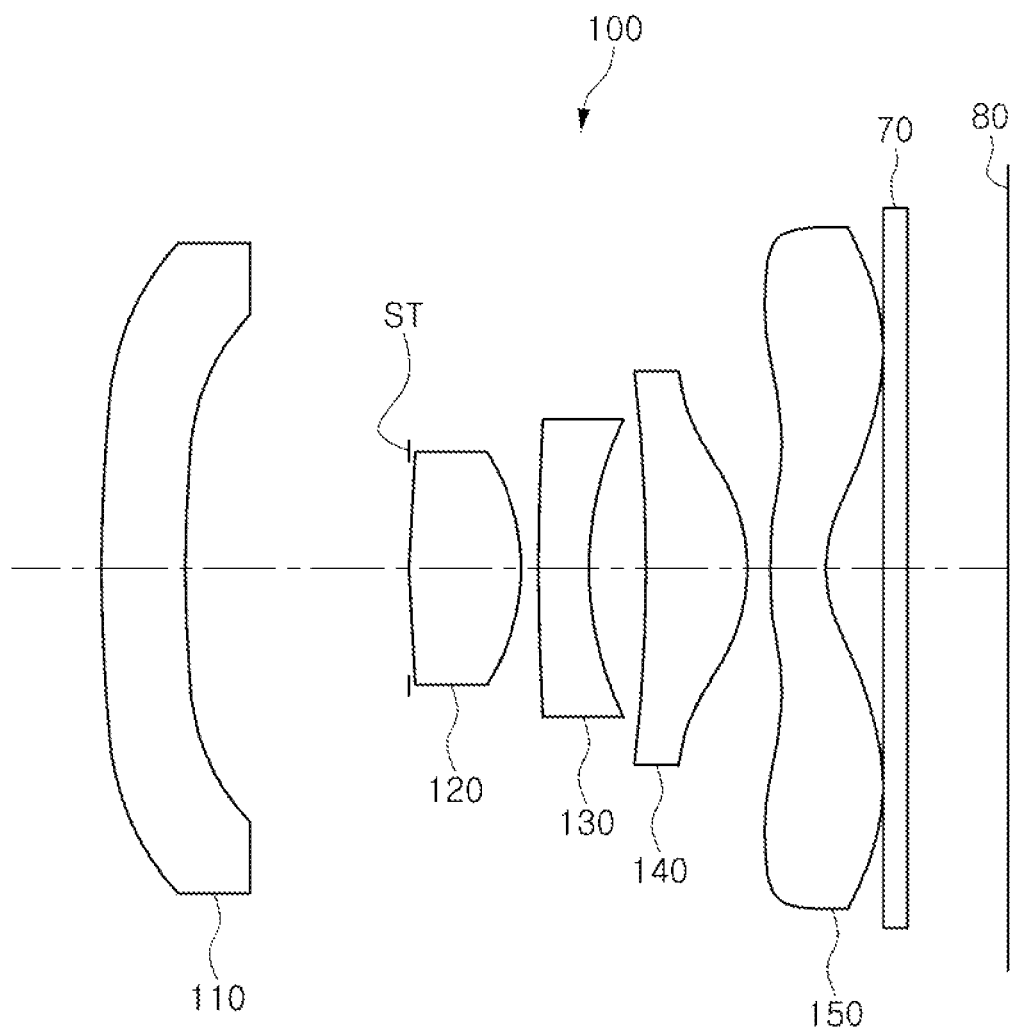
FIG. 1 is a view of a first example of a lens module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may embodied in different forms, and are not to be construed as being limited to the examples described herein. Rather, the examples described herein have been provided so that this disclosure will be thorough and complete, and will convey the full scope of the disclosure to one of ordinary skill in the art.

In this application, a first lens refers to a lens closest to an object (or a subject), while a sixth lens refers to a lens closest to an image plane of an image sensor. Further, a first surface of each lens refers to a surface thereof closest to an object (or a subject), and a second surface of each lens refers to a surface thereof closest to the image plane of the image sensor. Further, in the present specification, all of radii of curvature, thicknesses, OALs (optical axis distances from a first surface of the first lens to the image plane), SLs (distances from a stop to the image plane), ImgHs (image heights), and BFLs (back focus lengths) of the lenses, an overall focal length of an optical system, and a focal length of each lens are expressed in millimeters (mm). Further, thicknesses of lenses, gaps between the lenses, OALs, and SLs are distances measured in relation to an optical axis of the lenses. Further, in a description for shapes of the lenses, a statement that one surface of a lens is convex means that an optical axis portion of a corresponding surface is convex, and a statement that one surface of a lens is concave means that an optical axis portion of a corresponding surface is concave. Therefore, although it may be described that one surface of a lens is convex, an edge portion of the lens may be concave. Likewise, although it may be described that one surface of a lens is concave, an edge portion of the lens may be convex.

A lens module includes an optical system including a plurality of lenses. As an example, the optical system of the lens module may include five lenses having refractive power. However, the lens module is not limited thereto. For example, the lens module may include other components that do not have refractive power. As an example, the lens module may include a stop controlling an amount of light. As another example, the lens module may further include an infrared cut-off filter filtering infrared light. As another example, the lens module may further include an image sensor (that is, an imaging device) converting an image of a subject incident thereon through the optical system into electrical signals. As another example, the lens module may further include a gap maintaining member adjusting a gap between lenses.

First to fifth lenses may be formed of materials having a refractive index different from that of air. For example, the first to fifth lenses may be formed of plastic or glass. At least one of the first to fifth lenses may have an aspherical surface shape. As an example, only the fifth lens of the first to fifth lenses may have an aspherical surface shape. As another example, at least one surface of all of the first to fifth lenses may be aspherical. Here, the aspherical surface of each lens may be represented by the following Equation 1:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} \quad (1)$$

Here, c is an inverse of a radius of curvature of a corresponding lens, k is a conic constant, and r is a distance from a certain point on an aspherical surface to an optical axis in a direction perpendicular to the optical axis. In addition, constants A to J are respectively 4th order to 20th order aspherical surface coefficients. In addition, Z is a distance between the certain point on the aspherical surface at the distance r and a tangential plane meeting the apex of the aspherical surface of the lens.

The optical system of the lens module may have a wide field of view (FOV) of 87° or more. Therefore, the lens module may easily photograph a wide background or object.

The optical system of the lens module may satisfy the following Conditional Expression:

$$1.9 < ImgH/EPD$$

Here, ImgH is a maximum height in mm of an image plane of an image sensor (for reference, ImgH is ½ of a diagonal length of the image sensor), and EPD is an entrance pupil diameter of the lens module in mm.

The above Conditional Expression is a condition for realizing high brightness of an optical system. For example, an optical system in which ImgH/EPD is out of a lower limit value of the above Conditional Expression may not have a wide field of view of 80° or more or may not provide sufficient brightness.

The optical system of the lens module may satisfy the following Conditional Expression:

$$f1/f < -7.6$$

Here, f is an overall focal length in mm of the optical system including the first to fifth lenses, and f1 is a focal length in mm of the first lens.

The above Conditional Expression is a numerical condition for optimizing refractive power of the first lens. For example, in a case in which f1/f is out of an upper limit value of the above Conditional Expression, the first lens may have strong refractive power, which may be disadvantageous in spherical aberration correction.

The optical system of the lens module may satisfy the following Conditional Expression:

$$n3 - n5 < 0.1$$

Here, n3 is a refractive index of the third lens, and n5 is a refractive index of the fifth lens.

The above Conditional Expression is a condition for improving resolution of the optical system and significantly decreasing chromatic aberration. For example, in a case in which n3−n5 is out of an upper limit value of the above Conditional Expression, the third and fifth lenses may decrease resolution of the optical system or a chromatic aberration correction effect by the third and fifth lenses may be insufficient.

The optical system of the lens module may satisfy the following Conditional Expression:

$$0.3 < (r1-r2)/(r1+r2)$$

Here, r1 is a radius of curvature in mm of an object-side surface of the first lens, and r2 is a radius of curvature in mm of an image-side surface of the first lens.

The above Conditional Expression is a condition for improving an aberration correction effect and resolution by the first lens. For example, in a case in which (r1−r2)/(r1+r2) is out of a lower limit value of the above Conditional Expression, an aberration correction effect by the first lens may be insufficient, such that it is difficult to realize high resolution. To the contrary, in a case in which the above Conditional Expression is satisfied, the first lens may not only have an excellent aberration correction effect, but may also be advantageous in realizing a wide field of view.

Meanwhile, the above Conditional Expression may also be optimized in the following numerical range:

$$0.30 < (r1-r2)/(r1+r2) < 0.90$$

The optical system of the lens module may satisfy the following Conditional Expression:

$$0.7 < (r5-r6)/(r5+r6)$$

Here, r5 is a radius of curvature in mm of an object-side surface of the third lens, and r6 is a radius of curvature in mm of an image-side surface of the third lens.

The above Conditional Expression is a condition for improving an aberration correction effect and resolution by the third lens. For example, in a case in which (r5−r6)/(r5+r6) is out of a lower limit value of the above Conditional Expression, an aberration correction effect by the third lens may be insufficient, such that it is difficult to realize high resolution. To the contrary, in a case in which the above Conditional Expression is satisfied, the third lens may not only have an excellent aberration correction effect, but may also be advantageous in realizing high resolution.

Meanwhile, the above Conditional Expression may also be optimized in the following numerical range:

$$0.7 < (r5-r6)/(r5+r6) < 1.30$$

The optical system of the lens module may satisfy the following Conditional Expression:

$$1.7 < r1/TTL$$

Here, r1 is the radius of curvature in mm of the object-side surface of the first lens, and TTL is a distance in mm from the object-side surface of the first lens to the image plane.

The above Conditional Expression is a condition for optimizing manufacturing of the first lens. For example, in a case in which r1/TTL satisfies a lower limit value of the above Conditional Expression, the first lens may be advantageous in decreasing an overall length of the optical system.

The optical system of the lens module may be manufactured in the following form.

As an example, the optical system of the lens module includes a first lens having negative refractive power, a second lens having positive refractive power, a third lens having refractive power, a fourth lens having positive refractive power, and a fifth lens having negative refractive power.

As another example, the optical system of the lens module includes a first lens having negative refractive power, a second lens of which both surfaces are convex, a third lens having refractive power, a fourth lens of which an object-side surface is concave and an image-side surface is convex, and a fifth lens of which an object-side surface is convex and an image-side surface is concave.

Next, main components of the lens module will be described.

The first lens may have refractive power. For example, the first lens may have negative refractive power.

The first lens may be convex toward an object side. As an example, a first surface (object-side surface) of the first lens may be convex and a second surface (image-side surface) thereof may be concave.

The first lens may have an aspherical surface. For example, both surfaces of the first lens may be aspherical. The first lens may be formed of a material having high light transmissivity and excellent workability. For example, the first lens may be formed of plastic. However, a material of the first lens is not limited to plastic. For example, the first lens may be formed of glass.

The second lens may have refractive power. For example, the second lens may have positive refractive power.

Both surfaces of the second lens may be convex. As an example, a first surface of the second lens may be convex and a second surface thereof may be convex.

The second lens may have an aspherical surface. For example, both surfaces of the second lens may be aspherical. The second lens may be formed of a material having high light transmissivity and excellent workability. For example, the second lens may be formed of plastic. However, a material of the second lens is not limited to plastic. For example, the second lens may be formed of glass.

The third lens may have refractive power. For example, the third lens may have negative refractive power.

One surface of the third lens may be concave. As an example, a first surface of the third lens may be convex and a second surface thereof may be concave. As another example, both of the first and second surfaces of the third lens may be concave.

The third lens may have an aspherical surface. For example, both surfaces of the third lens may be aspherical. The third lens may be formed of a material having high light transmissivity and excellent workability. For example, the third lens may be formed of plastic. However, a material of the third lens is not limited to plastic. For example, the third lens may be formed of glass.

The third lens may be formed of a material having a high refractive index. For example, the third lens may be formed of a material having a refractive index of 1.60 or more (in this case, the third lens may have an Abbe number of 30 or less). The third lens formed of this material may easily refract light even when having a small curvature shape. Therefore, the third lens formed of this material may be easily manufactured and be advantageous in lowering a defect rate depending on a manufacturing tolerance. In addition, the third lens formed of this material may decrease a distance between lenses, such that it may be advantageous in miniaturizing the lens module.

The fourth lens may have refractive power. For example, the fourth lens may have positive refractive power.

The fourth lens may have a meniscus shape of which an image-side surface is convex. For example, a first surface of the fourth lens may be concave and a second surface thereof may be convex.

The fourth lens may include one or more inflection points. As an example, the fourth lens may have one or more inflection points formed on the image-side surface thereof.

The fourth lens may have an aspherical surface. For example, both surfaces of the fourth lens may be aspherical. The fourth lens may be formed of a material having high light transmissivity and excellent workability. For example, the fourth lens may be formed of plastic. However, a material of the fourth lens is not limited to plastic. For example, the fourth lens may be formed of glass.

The fifth lens may have refractive power. For example, the fifth lens may have negative refractive power.

The fifth lens may be convex toward the object side. As an example, a first surface of the fifth lens may be convex and a second surface thereof may be concave.

The fifth lens may include an inflection point. As an example, the fifth lens may have one or more inflection points formed on an object-side surface thereof. As another example, the fifth lens may have one or more inflection points formed on an image-side surface thereof. The object-side surface of the fifth lens configured as described above may have a convex part and a concave part formed alternately thereon. Similarly, the image-side surface of the fifth lens may be concave at the center of the optical axis thereof and may be convex at an edge portion thereof.

The fifth lens may have an aspherical surface. For example, both surfaces of the fifth lens may be aspherical. The fifth lens may be formed of a material having high light transmissivity and excellent workability. For example, the fifth lens may be formed of plastic. However, a material of the fifth lens is not limited to plastic. For example, the fifth lens may be formed of glass.

The image sensor may be configured to realize high resolution of 1300 megapixels. For example, a unit size of the pixels of the image sensor may be 1.12 µm or less.

The lens module configured as described above may have a wide field of view. For example, the optical system of the lens module may have a field of view of 87° or more. In addition, the lens module may have a relatively short length (TTL). For example, an overall length (distance from the object-side surface of the first lens to the image plane) of the optical system of the lens module may be 4.10 mm or less. Therefore, the lens module may be advantageously miniaturized.

FIG. 1 is a view of a first example of a lens module.

A lens module 100 includes an optical system including a first lens 110, a second lens 120, a third lens 130, a fourth lens 140, and a fifth lens 150. In addition, the lens module 100 may further includes an infrared cut-off filter 70 and an image sensor 80. Further, the lens module 100 further includes a stop (ST). In this example, the stop is disposed between the first lens 110 and the second lens 120.

In this example, the first lens 110 has negative refractive power, and an object-side surface thereof is convex and an image-side surface thereof is concave. The second lens 120 has positive refractive power, and both surfaces thereof are convex. The third lens 130 has negative refractive power, and an object-side surface thereof is convex and an image-side surface thereof is concave. The fourth lens 140 has positive refractive power, and an object-side surface thereof is concave and an image-side surface thereof is convex. The fifth lens 150 has negative refractive power, and an object-side surface thereof is convex and an image-side surface thereof is concave. In addition, one or more inflection points are formed on each of the object-side surface and the image-side surface of the fifth lens.

In this example, all of the first lens 110, the third lens 130, and the fifth lens 150 have negative refractive power as described above. Among these lenses, the first lens 110 has the strongest refractive power, and the fifth lens 150 has the weakest refractive power.

Figure 2:
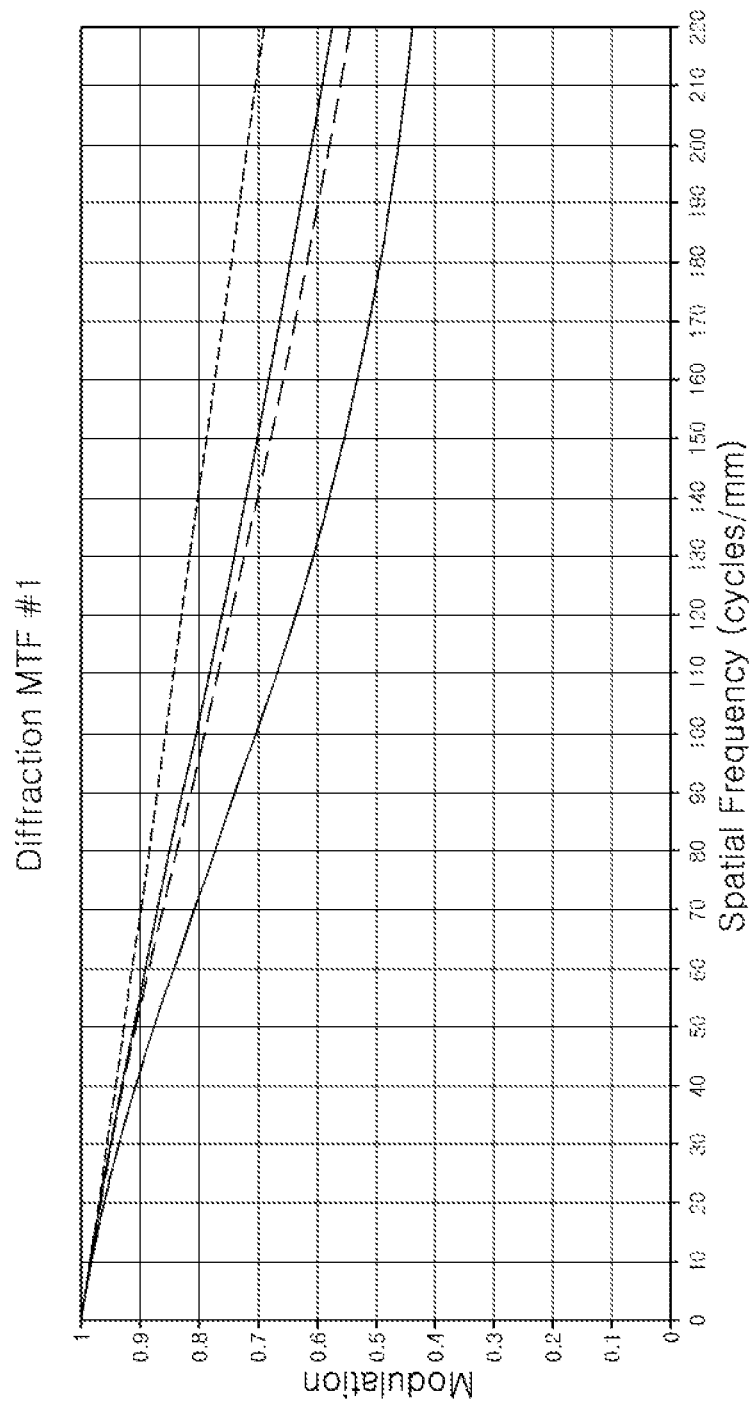
FIG. 2 is a graph including curves representing modulation transfer function (MTF) characteristics of the lens module illustrated in FIG. 1.

FIG. 2 is a graph including curves representing modulation transfer function (MTF) characteristics of the lens module illustrated in FIG. 1.

Figure 3:
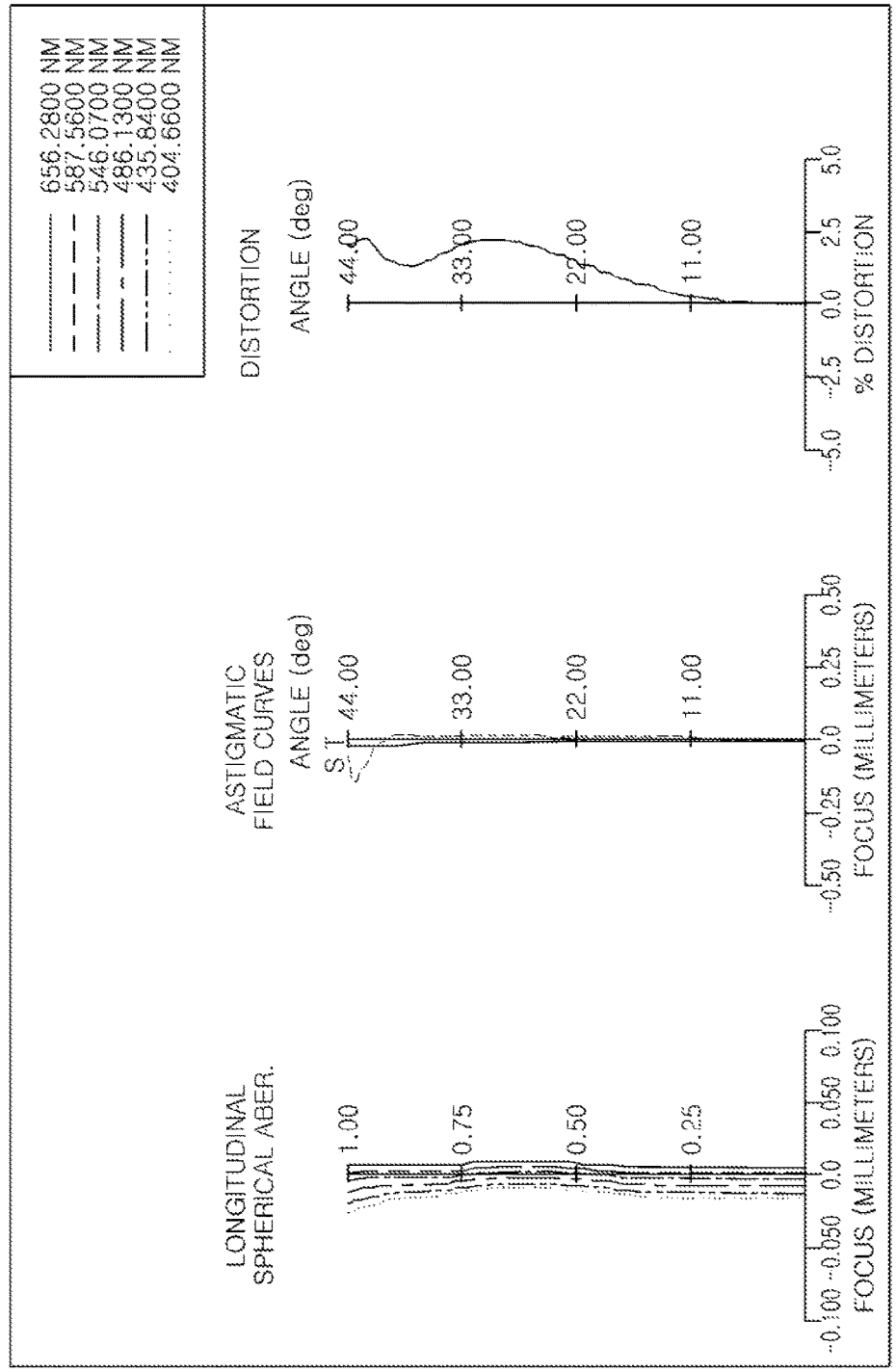
FIG. 3 is a graph including curves representing aberration characteristics of the lens module illustrated in FIG. 1.

FIG. 3 is a graph including curves representing aberration characteristics of the lens module illustrated in FIG. 1.

FIG. 4 is a table listing characteristics of the lenses of the lens module illustrated in FIG. 1. In FIG. 4, Surface Nos. 1 and 2 indicate the first surface (object-side surface) and the second surface (image-side surface) of the first lens, and Surface Nos. 3 and 4 indicate the first and second surfaces of the second lens. Similarly, Surface Nos. 5 to 10 indicate the first and second surfaces of the third to fifth lenses, respectively. In addition, Surface Nos. 11 and 12 indicate first and second surfaces of the infrared cut-off filter.

FIG. 5 is a table listing aspherical surface coefficients of the lenses of the lens module illustrated in FIG. 1. In FIG. 5, the labels of the columns are Surface Nos. of the first to fifth lenses, and the labels of the rows are characteristics corresponding to each surface of the lenses.

Figure 6:
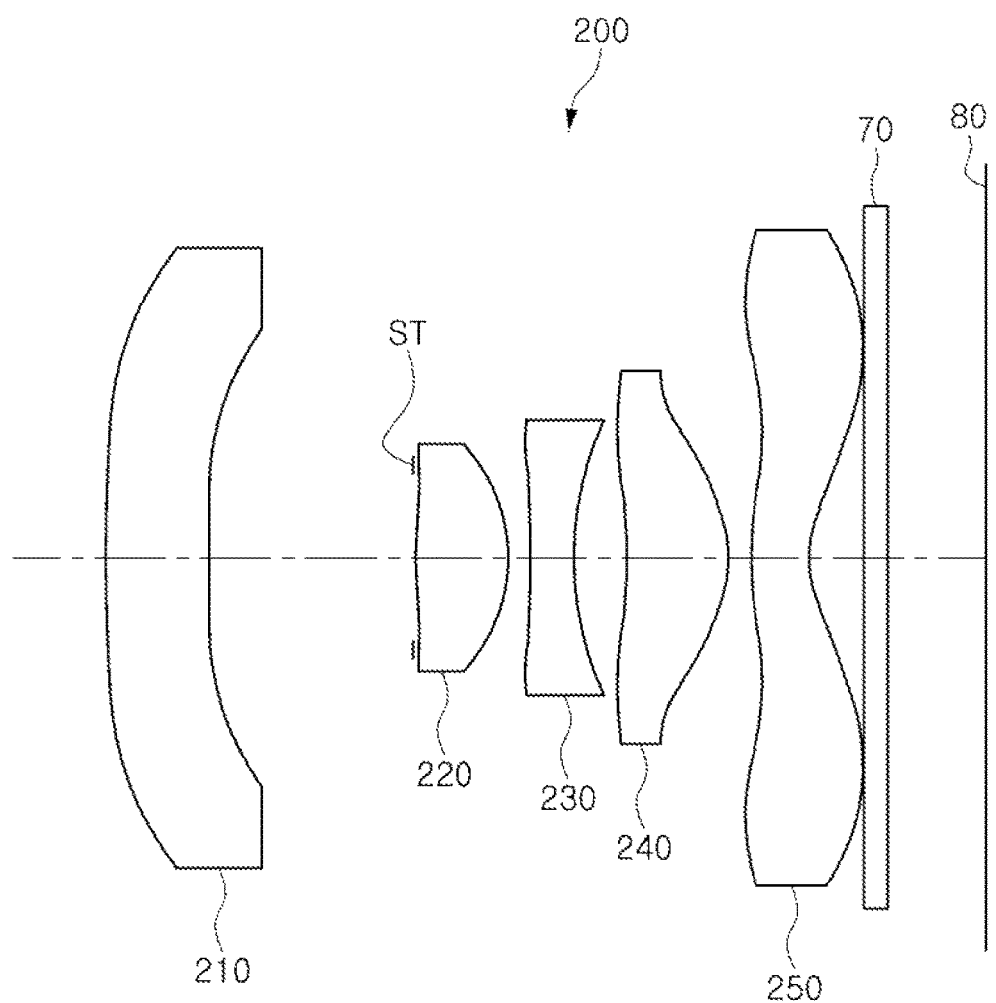
FIG. 6 is a view of a second example of a lens module.

FIG. 6 is a view of a second example of a lens module.

A lens module 200 includes an optical system including a first lens 210, a second lens 220, a third lens 230, a fourth lens 240, and a fifth lens 250. In addition, the lens module 200 further includes an infrared cut-off filter 70 and an image sensor 80. Further, the lens module 200 further includes a stop (ST). In this example, the stop is disposed between the first lens 210 and the second lens 220.

In this example, the first lens 210 has negative refractive power, and an object-side surface thereof is convex and an image-side surface thereof is concave. The second lens 220 has positive refractive power, and both surfaces thereof are convex. The third lens 230 has negative refractive power, and an object-side surface thereof is concave and an image-side surface thereof is concave. The fourth lens 240 has positive refractive power, and an object-side surface thereof is concave and an image-side surface thereof is convex. The fifth lens 250 has negative refractive power, and an object-side surface thereof is convex and an image-side surface thereof is concave. In addition, one or more inflection points are formed on each of the object-side surface and the image-side surface of the fifth lens.

In this example, all of the first lens 210, the third lens 230, and the fifth lens 250 have negative refractive power as described above. Among these lenses, the first lens 210 has the strongest refractive power, and the fifth lens 250 has the weakest refractive power.

Figure 7:
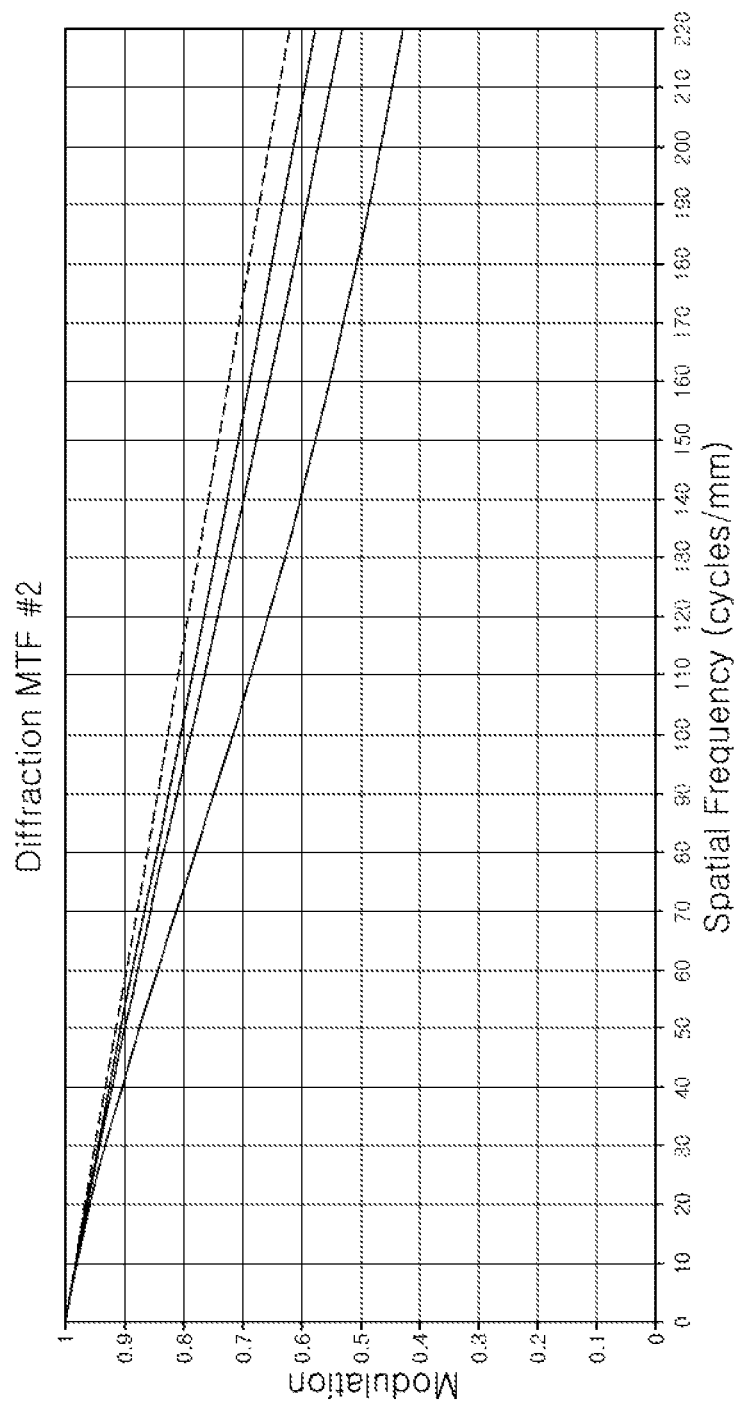
FIG. 7 is a graph including curves representing MTF characteristics of the lens module illustrated in FIG. 6.

FIG. 7 is a graph including curves representing MTF characteristics of the lens module illustrated in FIG. 6.

Figure 8:
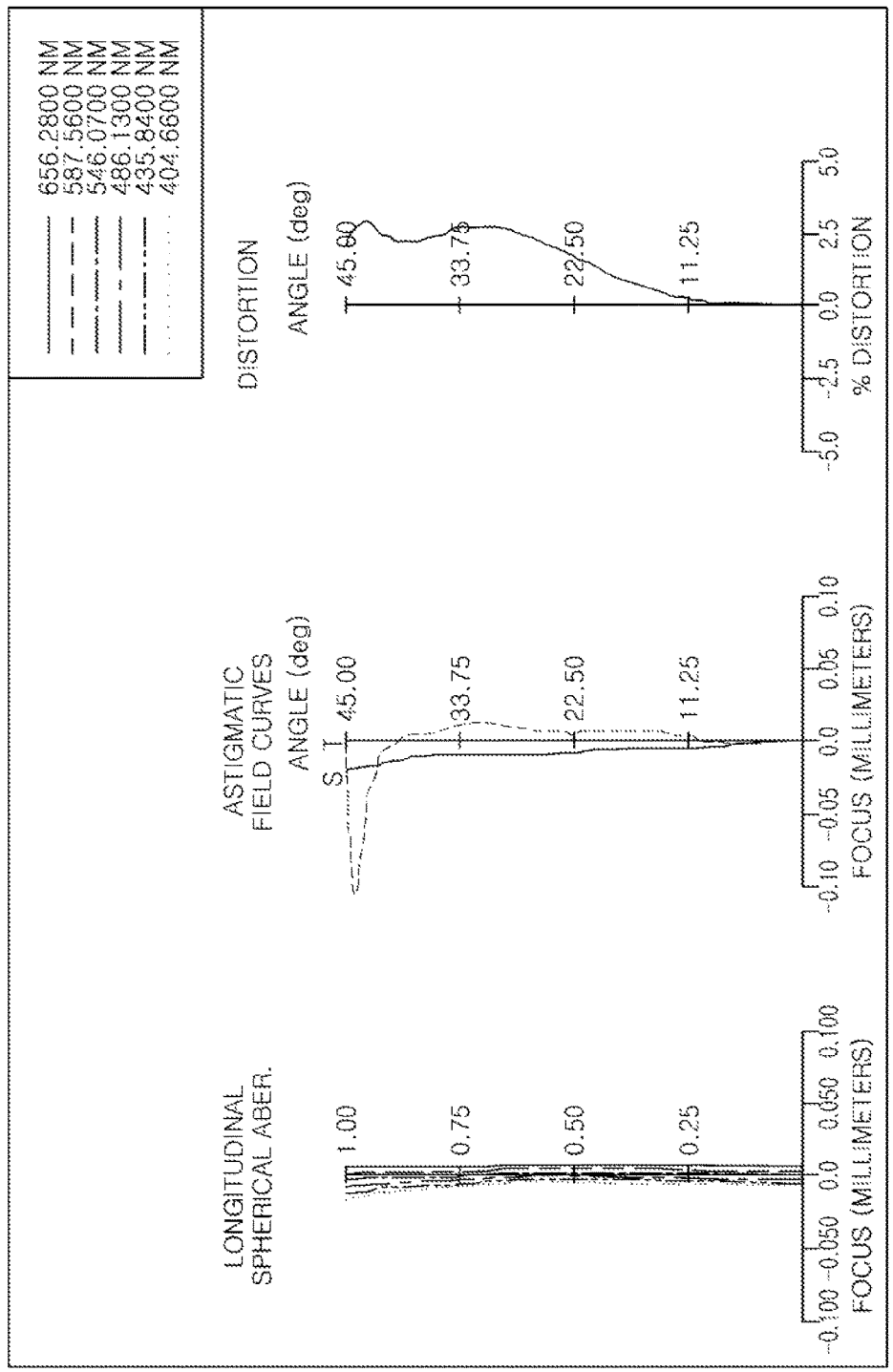
FIG. 8 is a graph including curves representing aberration characteristics of the lens module illustrated in FIG. 6.

FIG. 8 is a graph including curves representing aberration characteristics of the lens module illustrated in FIG. 6.

FIG. 9 is a table listing characteristics of the lenses of the lens module illustrated in FIG. 6. In FIG. 9, Surface Nos. 1 and 2 indicate the first surface (object-side surface) and the second surface (image-side surface) of the first lens, and Surface Nos. 3 and 4 indicate the first and second surfaces of the second lens. Similarly, Surface Nos. 5 to 10 indicate the first and second surfaces of the third to fifth lenses, respectively. In addition, Surface Nos. 11 and 12 indicate first and second surfaces of the infrared cut-off filter.

FIG. 10 is a table listing aspherical surface coefficients of the lenses of the lens module illustrated in FIG. 6. In FIG. 10, the labels of the columns are Surface Nos. of the first to fifth lenses, and the labels of the rows are characteristics corresponding to each surface of the lenses.

Figure 11:
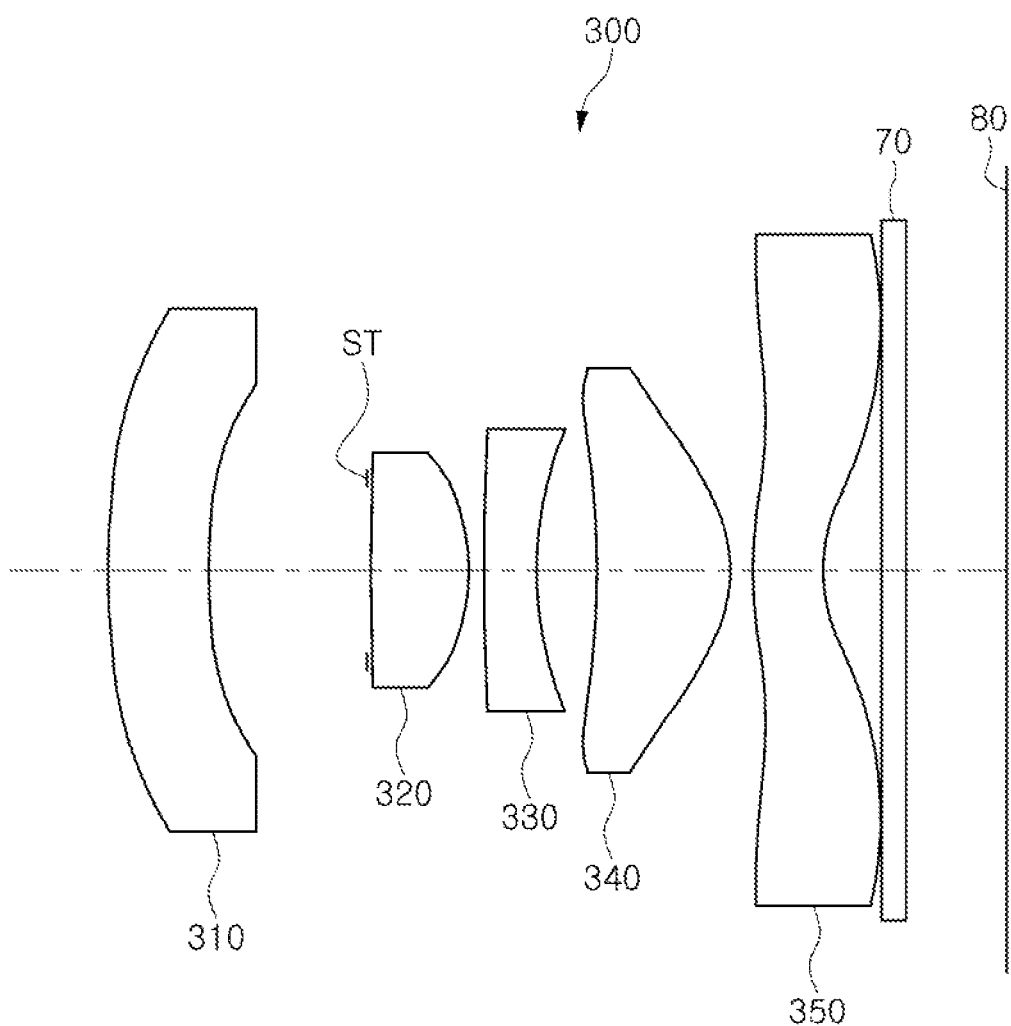
FIG. 11 is a view of a third example of a lens module.

FIG. 11 is a view of a third example of a lens module.

A lens module 300 includes an optical system including a first lens 310, a second lens 320, a third lens 330, a fourth lens 340, and a fifth lens 350. In addition, the lens module 300 further includes an infrared cut-off filter 70 and an image sensor 80. Further, the lens module 300 further includes a stop (ST). In this example, the stop is disposed between the first lens 310 and the second lens 320.

In this example, the first lens 310 has negative refractive power, and an object-side surface thereof is convex and an image-side surface thereof is concave. The second lens 320 has positive refractive power, and both surfaces thereof are convex. The third lens 330 has negative refractive power, and an object-side surface thereof is convex and an image-side surface thereof is concave. The fourth lens 340 has positive refractive power, and an object-side surface thereof is concave and an image-side surface thereof is convex. The fifth lens 350 has negative refractive power, and an object-side surface thereof is convex and an image-side surface thereof is concave. In addition, one or more inflection points are formed on each of the object-side surface and the image-side surface of the fifth lens.

In this example, all of the first lens 310, the third lens 330, and the fifth lens 350 have negative refractive power as described above. Among these lenses, the first lens 310 has the strongest refractive power, and the fifth lens 350 has the weakest refractive power.

Figure 12:
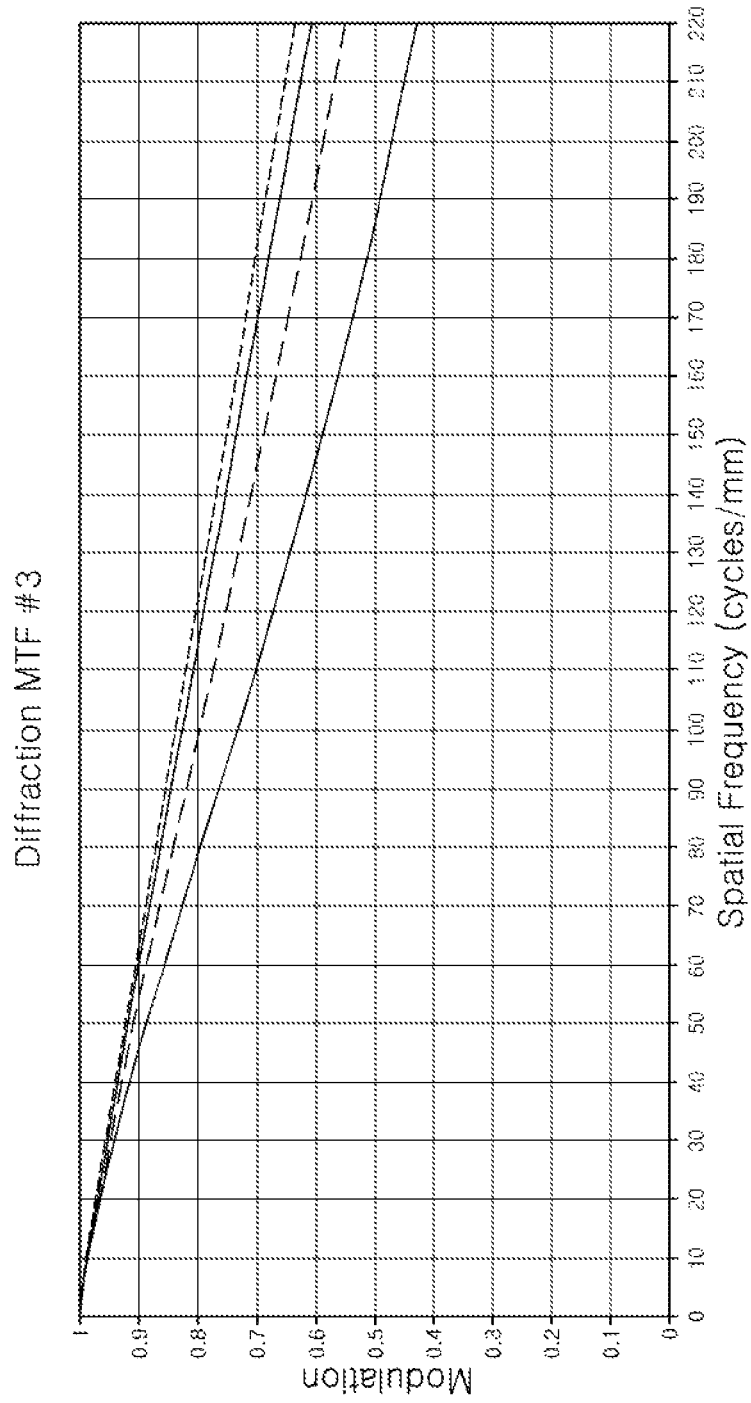
FIG. 12 is a graph including curves representing MTF characteristics of the lens module illustrated in FIG. 11.

FIG. 12 is a graph including curves representing MTF characteristics of the lens module illustrated in FIG. 11.

Figure 13:
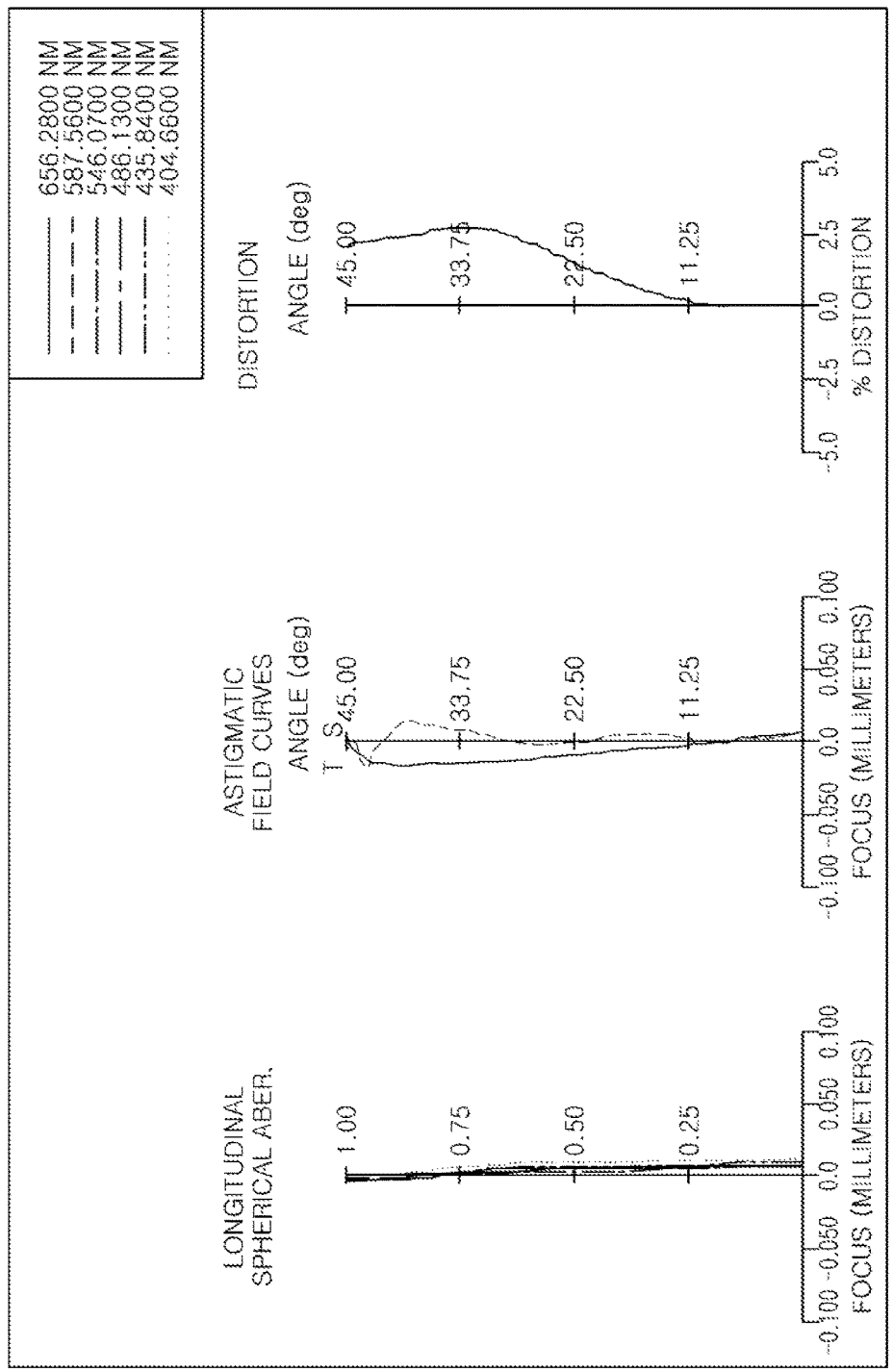
FIG. 13 is a graph including curves representing aberration characteristics of the lens module illustrated in FIG. 11.

FIG. 13 is a graph including curves representing aberration characteristics of the lens module illustrated in FIG. 11.

FIG. 14 is a table listing characteristics of the lenses of the lens module illustrated in FIG. 11. In FIG. 14, Surface Nos. 1 and 2 indicate the first surface (object-side surface) and the second surface (image-side surface) of the first lens, and Surface Nos. 3 and 4 indicate the first and second surfaces of the second lens. Similarly, Surface Nos. 5 to 10 indicate the first and second surfaces of the third to fifth lenses, respectively. In addition, Surface Nos. 11 and 12 indicate first and second surfaces of the infrared cut-off filter.

FIG. 15 is a table listing aspherical surface coefficients of the lenses of the lens module illustrated in FIG. 11. In FIG. 15, the labels of the columns are Surface Nos. of the first to fifth lenses, and the labels of the rows are characteristics corresponding to each surface of the lenses.

Figure 16:
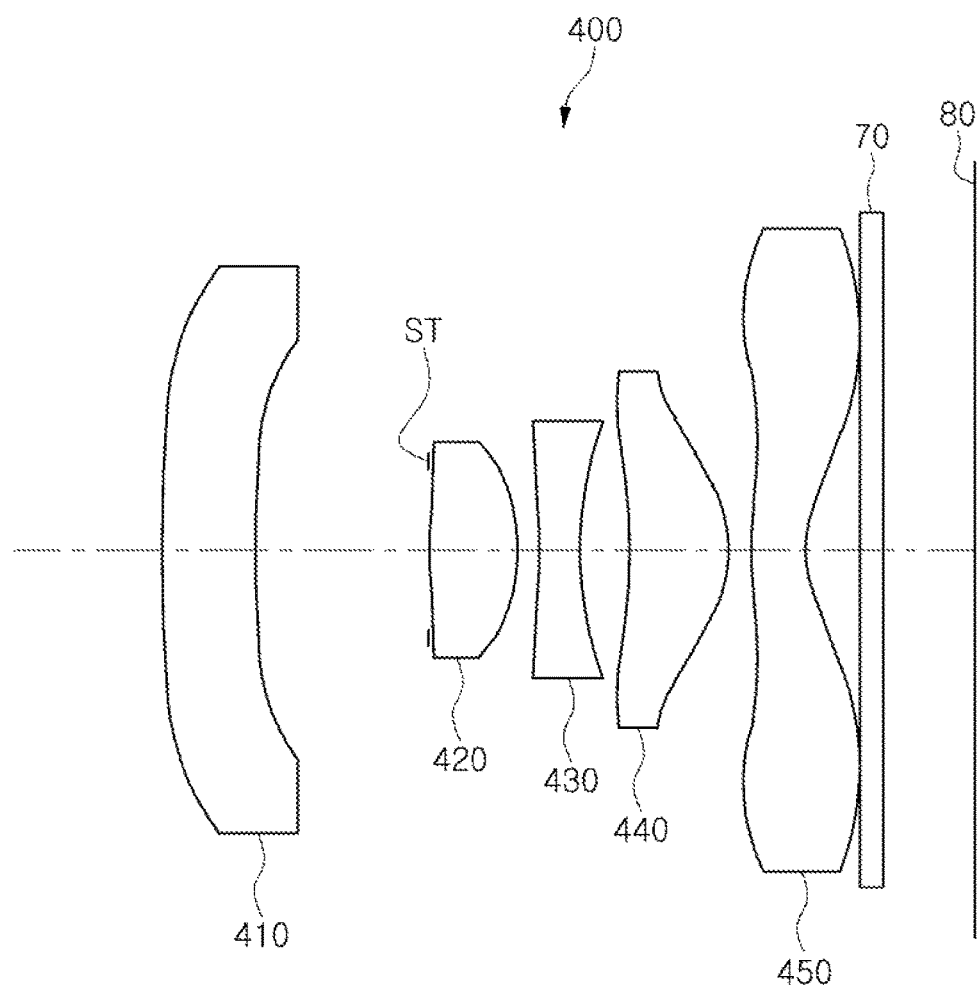
FIG. 16 is a view of a fourth example of a lens module.

FIG. 16 is a view of a fourth example of a lens module.

A lens module 400 includes an optical system including a first lens 410, a second lens 420, a third lens 430, a fourth lens 440, and a fifth lens 450. In addition, the lens module 400 further includes an infrared cut-off filter 70 and an image sensor 80. Further, the lens module 400 further includes a stop (ST). In this example, the stop is disposed between the first lens 410 and the second lens 420.

In this example, the first lens 410 has negative refractive power, and an object-side surface thereof is convex and an image-side surface thereof is concave. The second lens 420 has positive refractive power, and both surfaces thereof are convex. The third lens 430 has negative refractive power, and an object-side surface thereof is concave and an image-side surface thereof is concave. The fourth lens 440 has positive refractive power, and an object-side surface thereof is concave and an image-side surface thereof is convex. The fifth lens 450 has negative refractive power, and an object-side surface thereof is convex and an image-side surface thereof is concave. In addition, one or more inflection points are formed on each of the object-side surface and the image-side surface of the fifth lens.

In this example, all of the first lens 410, the third lens 430, and the fifth lens 450 have negative refractive power as described above. Among these lenses, the first lens 410 has the strongest refractive power, and the fifth lens 450 has the weakest refractive power.

Figure 17:
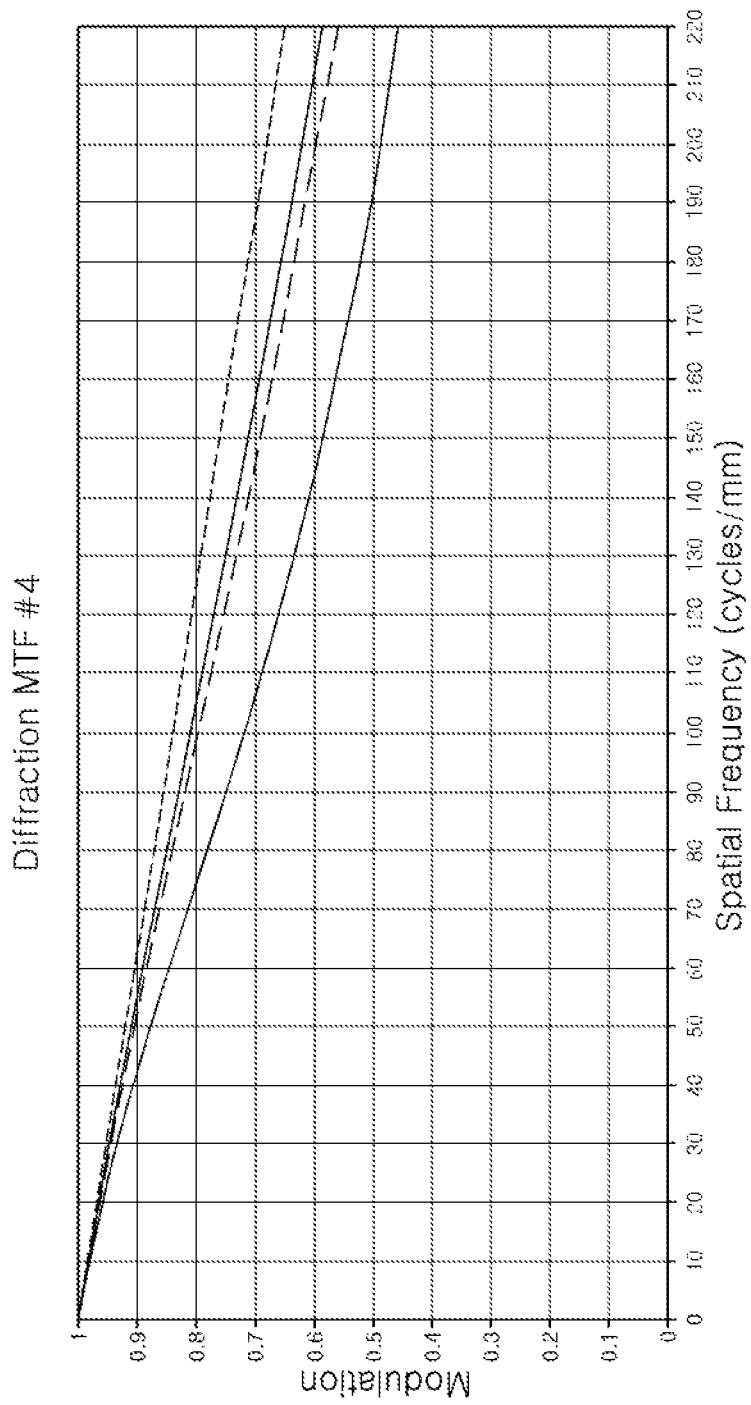
FIG. 17 is a graph including curves representing MTF characteristics of the lens module illustrated in FIG. 16.

FIG. 17 is a graph including curves representing MTF characteristics and aberration characteristics of the lens module illustrated in FIG. 16.

Figure 18:
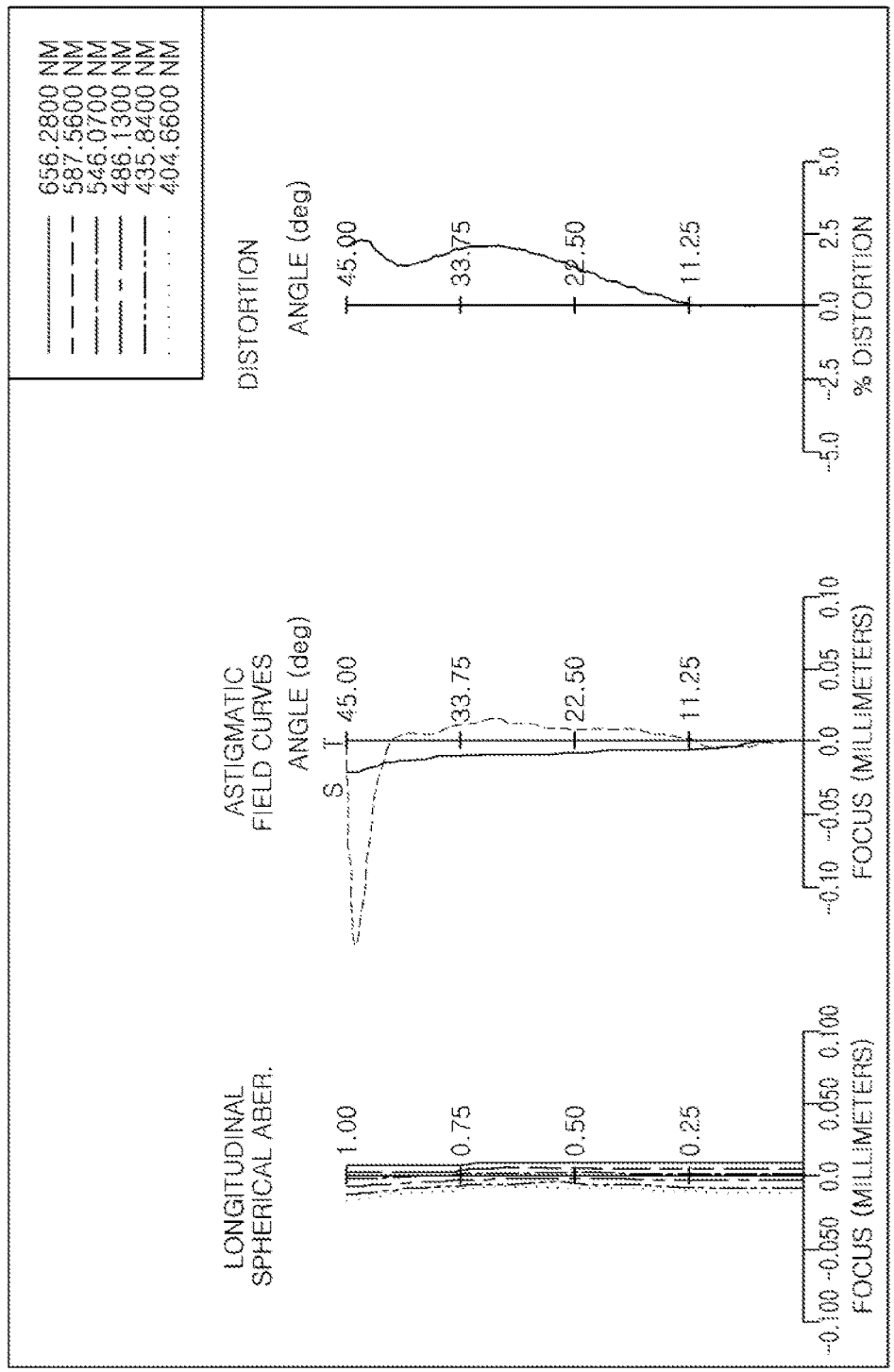
FIG. 18 is a graph including curves representing aberration characteristics of the lens module illustrated in FIG. 16.

FIG. 18 is a graph including curves representing aberration characteristics of the lens module illustrated in FIG. 16.

FIG. 19 is a table listing characteristics of the lenses of the lens module illustrated in FIG. 16. In FIG. 19, Surface Nos. 1 and 2 indicate the first surface (object-side surface) and the second surface (image-side surface) of the first lens, and Surface Nos. 3 and 4 indicate the first and second surfaces of the second lens. Similarly, Surface Nos. 5 to 10 indicate the first and second surfaces of the third to fifth lenses, respectively. In addition, Surface Nos. 11 and 12 indicate first and second surfaces of the infrared cut-off filter.

FIG. 20 is a table listing aspherical surface coefficients of the lenses of the lens module illustrated in FIG. 16. In FIG. 20, the labels of the columns are Surface Nos. of the first to fifth lenses, and the labels of the rows are characteristics corresponding to each surface of the lenses.

The following Table 1 lists optical characteristics of the lens modules of the first to fourth examples. The lens module has an overall focal length (f) of 1.70 to 1.90. A focal length (f1) of the first lens is determined in a range of −45.0 to −13.0. A focal length (f2) of the second lens is determined in a range of 1.30 to 1.60. A focal length (f3) of the third lens is determined in a range of −3.0 to −2.0. A focal length (f4) of the fourth lens is determined in a range of 1.20 to 1.30. A focal length (f5) of the fifth lens is determined in a range of −1.70 to −1.30. An entrance pupil diameter EPD is determined in a range of 0.780 to 0.960. An overall length of the optical system is determined in a range of 3.90 to 4.10. A field of view (FOV) is determined in a range of 87.0 to 91.0.

TABLE 1

| Remarks | First Example | Second Example | Third Example | Fourth Example |
| --- | --- | --- | --- | --- |
| f (EFL) | 1.8420 | 1.7790 | 1.7790 | 1.8790 |
| f1 | −29.2317 | −23.8539 | −13.6414 | −46.0580 |
| f2 | 1.5092 | 1.3624 | 1.5240 | 1.4929 |
| f3 | −2.6039 | −2.1924 | −2.4205 | −2.5844 |
| f4 | 1.2499 | 1.2392 | 1.2596 | 1.2666 |
| f5 | −1.3639 | −1.3826 | −1.6251 | −1.3430 |
| TTL | 4.0800 | 4.0490 | 4.0500 | 3.9910 |
| BFL | 0.8180 | 0.8110 | 0.8220 | 0.8350 |
| FOV | 88.00 | 90.00 | 90.00 | 90.00 |
| EPD | 0.9530 | 0.7850 | 0.8970 | 0.7850 |
| ImgH | 1.8100 | 1.8100 | 1.8100 | 1.9100 |

The following Table 2 lists numerical values of Conditional Expressions of the lens modules of the first to fourth examples.

TABLE 2

| Conditional Expressions | First Example | Second Example | Third Example | Fourth Example |
|---|---|---|---|---|
| ImgH/EPD | 1.8993 | 2.3057 | 2.0178 | 2.4331 |
| f1/f | −15.870 | −13.409 | −7.668 | −24.512 |
| n3 − n5 | 0.0720 | 0.0720 | 0.0000 | 0.0720 |
| (r1 − r2)/(r1 + r2) | 0.8629 | 0.7943 | 0.3291 | 0.6666 |
| (r5 − r6)/(r5 + r6) | 0.8518 | 1.2515 | 0.7005 | 1.1528 |
| r1/TTL | 49.020 | 24.697 | 1.714 | 25.0564 |

As seen in Table 2, the lens modules of the first to fourth examples satisfy all of the Conditional Expressions.

The examples described above enable the optical system to have high resolution.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens module comprising:
a first lens having negative refractive power;
a second lens having positive refractive power;
a third lens having refractive power;
a fourth lens having positive refractive power; and
a fifth lens having negative refractive power and having one or more inflection points on an image-side surface thereof;
wherein the first to fifth lenses are sequentially disposed in numerical order from the first lens to the fifth lens from an object side of the lens module toward an image plane of the lens module,
wherein $0.3<(r1-r2)/(r1+r2)$ is satisfied,
where r1 is a radius of curvature of an object-side surface of the first lens, and
r2 is a radius of curvature of an image-side surface of the first lens, and
wherein $f1/f<-7.6$ is satisfied,
where f is an overall focal length of an optical system comprising the first to fifth lenses, and
f1 is a focal length of the first lens.

2. The lens module of claim 1, wherein the third lens has negative refractive power.

3. The lens module of claim 1, wherein $1.9<ImgH/EPD$ is satisfied,
where ImgH is ½ of a diagonal length of the image plane, and
EPD is an entrance pupil diameter of the lens module.

4. The lens module of claim 1, wherein $n3-n5<0.1$ is satisfied,
where n3 is a refractive index of the third lens, and
n5 is a refractive index of the fifth lens.

5. The lens module of claim 1, wherein $0.7<(r5-r6)/(r5+r6)$ is satisfied,
where r5 is a radius of curvature of an object-side surface of the third lens, and
r6 is a radius of curvature of an image-side surface of the third lens.

6. The lens module of claim 1, wherein $1.7<r1/TTL$ is satisfied,
where r1 is the radius of curvature of the object-side surface of the first lens, and
TTL is a distance from the object-side surface of the first lens to the image plane.

7. The lens module of claim 1, wherein $87.0°<FOV$ is satisfied,
where FOV is a field of view, in degrees, of an optical system comprising the first to fifth lenses.

8. A lens module comprising:
a first lens having negative refractive power;
a second lens, an object-side surface thereof and an image-side surface thereof both being convex;
a third lens having refractive power;
a fourth lens, an object-side surface thereof being concave and an image-side surface thereof being convex; and
a fifth lens, an object-side surface thereof being convex and an image-side surface thereof being concave, the fifth lens having one or more inflection points on the image-side surface,
wherein the first to fifth lenses are sequentially disposed in numerical order from the first lens to the fifth lens from an object side of the lens module toward an image plane of the lens module,
wherein $0.3<(r1-r2)/(r1+r2)$ is satisfied,
where r1 is a radius of curvature of an object-side surface of the first lens, and
r2 is a radius of curvature of an image-side surface of the first lens, and
wherein $f1/f<-7.6$ is satisfied,
where f is an overall focal length of an optical system comprising the first to fifth lenses, and
f1 is a focal length of the first lens.

9. The lens module of claim 8, wherein the object-side surface of the first lens is convex, and the image-side surface of the first lens is concave.

10. The lens module of claim 8, wherein an object-side surface of the third lens is convex, and an image-side surface of the third lens is concave.

11. The lens module of claim 8, wherein an object-side surface of the third lens is concave.

12. The lens module of claim 8, wherein the second lens has positive refractive power.

13. The lens module of claim 8, wherein the third lens has negative refractive power.

14. The lens module of claim 8, wherein the fourth lens has positive refractive power.

15. The lens module of claim 8, wherein the fifth lens has negative refractive power.

* * * * *